United States Patent [19]
Francis

[11] 3,917,197
[45] Nov. 4, 1975

[54] AIRCRAFT
[75] Inventor: Robert Hugh Francis, Farnborough, England
[73] Assignee: Hawker-Siddeley Aviation Ltd., Surrey, England
[22] Filed: May 20, 1969
[21] Appl. No.: 828,096

[30] Foreign Application Priority Data
May 21, 1968 United Kingdom............. 24246/68

[52] U.S. Cl. .................................. 244/93; 60/39.6
[51] Int. Cl. ............................................ B64c 17/00
[58] Field of Search ......... 244/130, 119, 15, 62, 73; 60/35.6 RJ

[56] References Cited
UNITED STATES PATENTS

| | | | |
|---|---|---|---|
| 3,008,669 | 11/1961 | Tanczos et al. | 244/15 |
| 3,273,334 | 9/1966 | Tanczos et al. | 60/35.6 R |
| 3,360,221 | 12/1967 | Heskestad | 244/130 X |
| 3,489,375 | 1/1970 | Tracy | 244/119 X |

Primary Examiner—Robert F. Stahl
Attorney, Agent, or Firm—Dowell & Dowell

[57] ABSTRACT

A supersonic aircraft has a fuselage that is substantially of the maximum cross-sectional area until a point not far from the extreme rear end and aft of this point it terminates in a tapering streamline tail section of subsonic design, that is to say satisfactory for subsonic flight but such as would ordinarily create an excessive drag penalty in supersonic flight. With this design of subsonic tail, the drag penalty is avoided by burning fuel externally of the fuselage around a region just forward of that at which boundary layer separation would otherwise occur during supersonic flight if burning were not performed. With twin propulsion engines disposed one on either side of the fuselage, the design makes possible the installation of direct lift jet engines in the fuselage between the two propulsion engines.

4 Claims, 3 Drawing Figures

AIRCRAFT

This invention relates to aircraft and, more specifically, aircraft designed to fly at supersonic speeds.

To be of useful volume the fuselage of an aircraft needs to be of considerable cross section; and in order to make the drag penalty acceptable the rear end of the fuselage terminates in a tapering streamline tail-piece or fairing. In the case of flight at subsonic speeds this fairing can be tolerably short. But for supersonic flight the comparatively short subsonic fairing design does not suffice and it is necessary to increase considerably the length of the fairing. The alternative to this is to reduce the cross section of at least the rear portion of the fuselage in the supersonic case, which naturally restricts the useful volume within the fuselage. It is an object of the present invention to overcome this apparent dilemna.

According to the invention, there is provided an aircraft fuselage, or like aerodynamic body, for supersonic flight but having a comparatively short rear end fairing suitable merely for subsonic flight, and wherein the excessive drag penalty that would otherwise occur in supersonic flight is overcome by burning fuel at the exterior of the fuselage in the region of the forward end of the tail fairing.

In this way, the subsonic tail fairing is made suitable also for supersonic flight and the need for a long supersonic design of tail fairing is eliminated. Or put another way, for a particular length of tail fairing the fuselage volume in the supersonic case is increased. The result is an aircraft design that achieves supersonic flight more economically than hitherto.

In the preferred form, the external burning starts just ahead of the region where expansion shock or breakaway of the boundary layer would take place during supersonic flight in the absence of such burning.

By employment of the invention it will be possible either to increase the range or load-carrying capability of supersonic aeroplanes in an ecnomical way or, as perhaps a more interesting possibility, to provide the necessary space for the installation of direct lift engines. The latter alternative would make it economically feasible to design an aeroplane capable of both vertical take-off and supersonic flight over a reasonable range. It should be noted that current aeroplanes which are reputed to have both these capabilities cannot achieve both in the same flight. They can either take off vertically with an insufficient quantity of fuel for any reasonably sustained supersonic flight, or they can take-off conventionally and even then achieve supersonic flight over a comparatively short range, because of the limited amount of fuel which they can carry within the confines of the airframe.

External burning itself has been proposed hitherto but not in conjunction with a tail end fairing design. Thus, base burning is a known technique of expelling and igniting fuel, preferably hydrogen, at the extreme rear end of a body with a blunt rear end face. The resultant combustion that takes place at substantially constant pressure has the effect of substantially or entirely reducing the drag-producing pressure difference, normally obtained at high speed, between ambient pressure and the local pressure immediately aft of a blunt-ended body.

The invention may be applied beneficially to the rear end of a fuselage of an aeroplane where the propulsion nozzles are located at the side of the aircraft. Alternatively, substantial benefit can be obtained at the rear end of a fuselage which extends to some extent aft of the nozzle of a jet propulsion unit, particularly in the case where there are two propulsion units side by side.

In order to explain the nature of the invention in greater detail, reference will now be had to the accompanying drawings, in which.

Figures 1, 2:
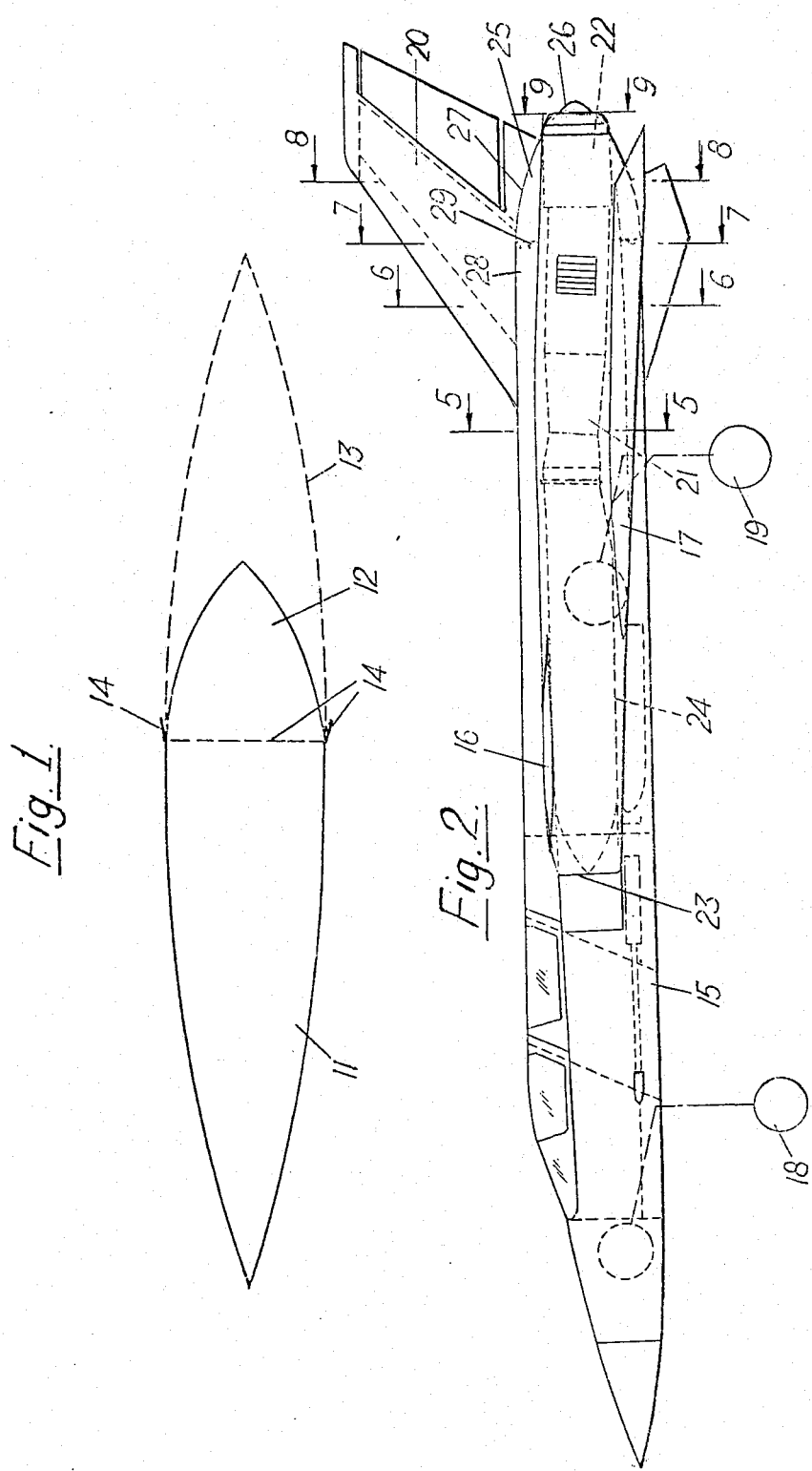
FIG. 1 is a diagram to illustrate the principle of the invention.
FIG. 2 is a side elevation of an aircraft to which the invention is applied.

Referring first to FIG. 1, this shows an aerodynamic body 11 of streamline form intended to travel in the direction of the arrow F. For subsonic speeds the body is provided with the tapering tail fairing 12 shown in full lines. However, at supersonic speeds such a design of tail fairing is too short and will result in expansion shock and breakaway of the boundary air and high drag. The much longer tail fairing shown at 13 in broken lines is a suitable design for the supersonic flight mode.

To avoid the alternatives of either employing the long tail 13 or reducing the cross section of the body 11 so as to make possible a supersonic shape without increase in length, the technique according to the invention is to perform exterior burning of fuel around the body 11, starting at a region 14 just in front of the point where separation of the boundary air would otherwise take place in supersonic flight of the body having the subsonic tail section 12. This, in effect, makes the subsonic tail design 12 suitable for both subsonic and supersonic flight without incurring the excessive drag penalty that would result in supersonic flight if no exterior burning took place.

There could, indeed, employing the burning technique described, be a discontinuity in the otherwise smoothly curved exterior shape of the body 11 to the rear of the region of burning where the main section of the body effectively joins the tail section, without the generation of intolerable drag.

Figure 3:
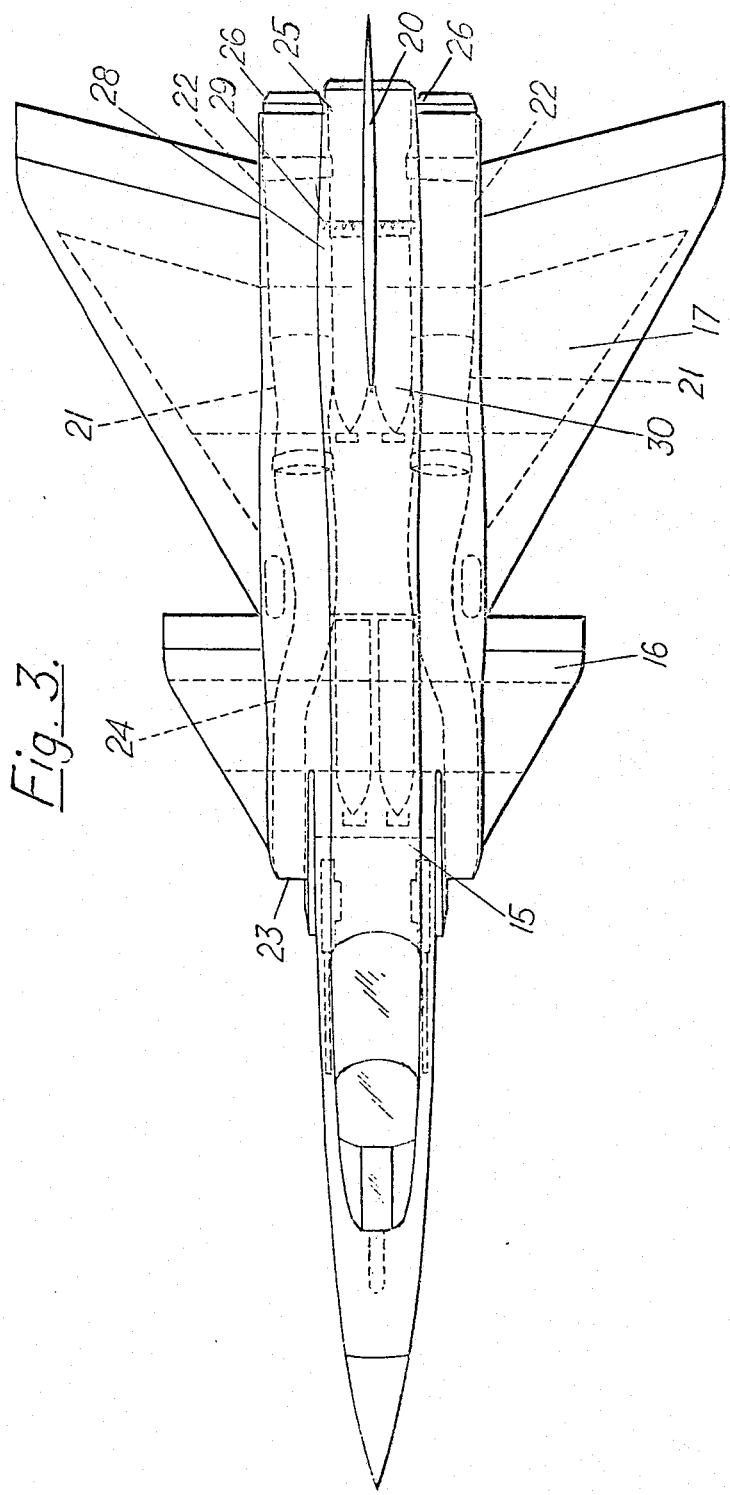
FIG. 3 is a plan of the aircraft.

FIGS. 2 and 3 show a practical design of supersonic aircraft to which the technique according to the invention has been applied. The aircraft is a small military type having a fuselage 15, high fore and low main planes 16, 17, fore and main undercarriges 18, 19 and a tail fin 20. Propulsion of the aircraft is by means of two gas turbines jet propulsion engines 21 situated on either side of the fuselage 15 and fitted with tail pipes 22 equipped with thrust reversers. Air for the engines is taken in through forwardly-facing side intakes 23 and air passages 24.

To be effective as a strike aircraft such a design must make provision for adequate stowage of armament and sufficient fuel tank capacity for a reasonable range. Most of the space for this has to be found within the fuselage. Therefore, in the design illustrated not only is the cross section of the fuselage 15 comparatively large but the large cross-sectional area is maintained rearward with very little reduction until a point close to the extreme tail. The fuselage 15 does have a tapering tail fairing 25 but it is quite short in extent and projects rearward hardly any farther than the two engine nozzles 26 which lie on either side of it. It will be seen that the curvature of this tail section, as visible at 27 in FIG. 2, is quite sharp, in order to taper the tail rapidly down from the large fuselage cross section just forward at 28.

This design would be feasible as a subsonic aircraft but, in the ordinary way, it would not be practicable for supersonic flight which would require a long gently tapering tail section projecting back far beyond the point at which the aircraft illustrated terminates. However, according to the invention the problem is overcome by burning fuel externally of the fuselage around the regions marked at 29. This is just in advance of the region at which expansion shock and boundary layer separation would otherwise occur, due to the sharply tapering tail section, in supersonic flight. Quite simple burners can be employed situated at intervals along the line 29 and having the appropriate fuel supply pipes and fuel rate control valves within the fuselage. The intolerable drag penalty that would otherwise arise, due to the stubby tail section 25, in supersonic flight is thereby avoided.

I claim:

1. An aerodynamic body, such as an aircraft fuselage, for supersonic flight, having a rearwardly tapering rear end fairing suitable merely for subsonic flight, and means ejecting and burning fuel at the exterior of the fuselage substantially at the forward end of said rear end fairing and just ahead of the region where breakaway of the boundary layer would take place during supersonic flight in the absence of such burning, whereby the excessive drag penalty that would otherwise occur in supersonic flight is overcome.

2. An aircraft fuselage according to claim 1, wherein the tail fairing on the fuselage is situated between the propulsion nozzles of twin gas turbine jet propulsion engines that are installed one on either side of the fuselage.

3. An aircraft fuselage according to claim 2, wherein ahead of the region of burning, and between the two propulsion engines, the fuselage provides space for the installation of direct jet lift engines.

4. An aircraft fuselage according to claim 1, wherein at the region of burning the fuselage has a cross section substantially the same as its greatest cross section.

* * * * *